M. SMITHEY.
AUTOMOBILE CLOCK.
APPLICATION FILED NOV. 5, 1915.

1,197,406.

Patented Sept. 5, 1916.

WITNESSES:
H. Schmidt
N. E. Beck

INVENTOR
MARVIN SMITHEY,
BY Munn & Co.
ATTORNEYS

UNITED STATES PATENT OFFICE.

MARVIN SMITHEY, OF LAWRENCEVILLE, VIRGINIA.

AUTOMOBILE-CLOCK.

1,197,406.      Specification of Letters Patent.      Patented Sept. 5, 1916.

Application filed November 5, 1915. Serial No. 59,790.

*To all whom it may concern:*

Be it known that I, MARVIN SMITHEY, a citizen of the United States, and a resident of Lawrenceville, in the county of Brunswick and State of Virginia, have invented a new and useful Improvement in Automobile-Clocks, of which the following is a specification.

My invention is an improvement in automobile clocks, and the invention has for its object to provide mechanism in connection with clocks designed for use on automobiles, and of the calendar type, having means for indicating the months, the day of the month and the day of the week, wherein mechanism is provided in connection with the clock and capable of attachment to the clock and released therefrom for indicating to the driver or owner the need of attending to certain necessary details in regard to the operation of the vehicle, as for instance, to oil the springs on certain days of the month, to wind the clock, to fill the storage batteries, and like details.

Figure 1:
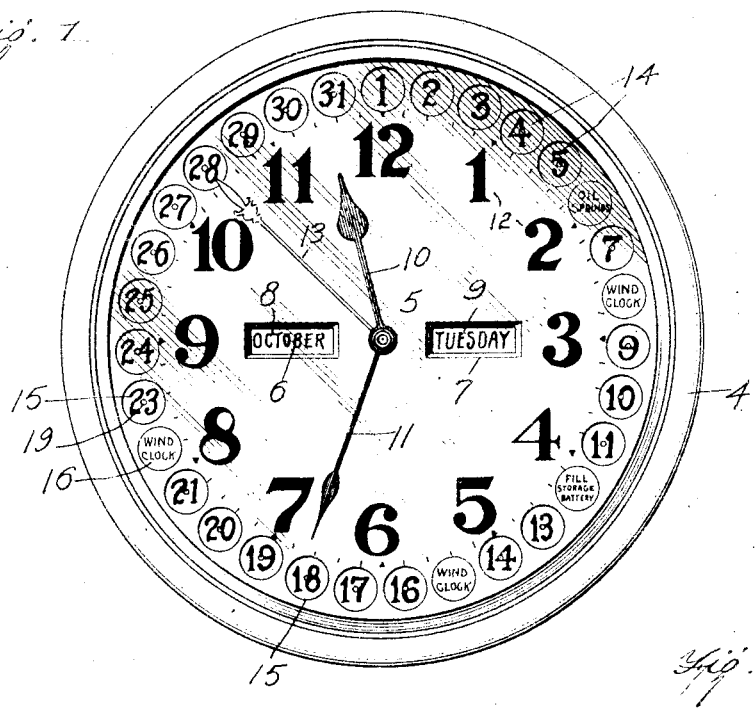
Figure 2:
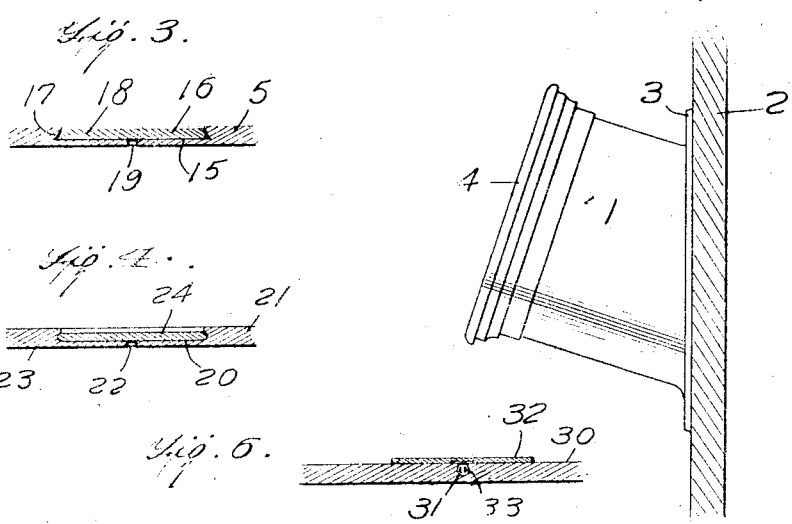

In the drawings: Figure 1 is a front view of the improved clock, Fig. 2 is a side view showing the clock mounted on the vehicle, and Figs. 3, 4, 5 and 6 are sectional views through the dial, showing various embodiments of the invention.

The clock designated generally at 1, is of ordinary construction, and is secured to the dash 2 of the vehicle, the case of the clock being so arranged that when the base 3 of the clock is secured to the dash the face 4 of the clock will be inclined slightly to permit inspection of the face of the clock from the driver's seat.

As shown in Fig. 1, the face 4 of the clock is provided with a dial 5, having openings 6 and 7, arranged with their long axes in alinement and horizontal, and through these openings appear legends 8 and 9, indicating the month and the week respectively. The hour and minute hands 10 and 11 respectively coöperate with an annular series of numerals 12 in the usual manner to indicate the time, and a pointer 13 is provided coöperating with an annular series of numerals for designating the day of the month.

Figure 3:
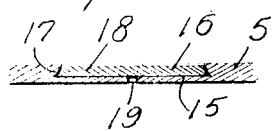

The last-named series 14 of numerals run from 1 to 31 and they are arranged in consecutive order with the numeral 1 above the numeral 12 of the series 12. Each of the numerals from 1 to 31 inclusive is arranged within a circular depression or recess 15 on the dial or in a ring encircling the dial between the periphery of the dial and the case of the clock and these recesses shown more particularly in Fig. 3 are of sufficient depth to receive disks 16 of suitable material, as for instance, transparent celluloid, the disks being shaped to fit and fill the recesses. These disks bear upon one face printed legends indicating certain necessary details in the operation of the vehicle as for instance, wind clock, fill storage batteries, oil springs, and the like. The disks are releasably held in the recesses so that any predetermined disk may be inserted in any predetermined recess and held in such recess until it is desired to remove the same.

Any preferred form of holding means may be used, as for instance in Fig. 3, where the side wall of the recess 15 is undercut as indicated at 17, and the peripheral edge of the disk is beveled as indicated at 18 to fit the undercut wall 17. The disk 16 in this instance is of such size with respect to the recess 15 that it may be inserted in the recess or detached therefrom. The disks are inserted in the recess by merely pushing them into place and to permit them to be detached easily an opening 19 is provided in the dial 5 at the center of each recess to permit the insertion of a tool as for instance, a rod, to engage the disk and to push it from out the recess.

Figure 4:
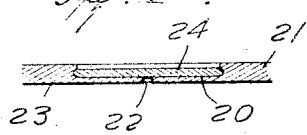

In Fig. 4 the recesses 20 of the dial 21 have central openings 22, corresponding to the openings 19. The side wall of each recess 20 is slightly undercut as indicated at 23, and the disks 24 are of such size that they may be snapped down beneath the overhanging portion of the undercut wall to prevent release of the disk. By means of the opening 22 the disk 24 may be removed in the same manner as the disk 16.

Figure 5:
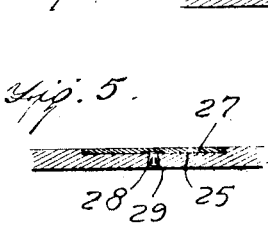

In Fig. 5 the recesses 25 of the dial 26 have their walls perpendicular to the plane of the dial, and the disks 27 are of a size to fit and fill the recesses. A recess or depression 28 is provided in the dial at the center of each recess and each disk has a resilient head 29 for engaging the recess to hold the disk in place. The recess and head constitute a snap fastener of ordinary construction, and the disk may be detached by inserting the nail or a pin between the peripheral edge thereof and the side wall of the recess.

In Fig. 6, the dial 30 is provided with a recess or depression 31 at each of the numerals indicating the days of the month, and each disk 32 of the same character as the disks before mentioned, and used for the same purpose, is provided with a resilient head 33 for engaging the recesses 31.

In the last-described embodiment the disks are seated on the upper face of the dial, while in the construction of Figs. 3, 4 and 5 the disks are seated in depressions formed in the surface of the dial.

In use a number of disks will be provided with each clock, the disks being of any suitable material, and bearing any desired legends on their outer faces. At the beginning of the month the driver will place the disks in proper relation with respect to the numerals 14. If the clock is the eight-day clock, a disk having the legend "Wind clock" will be placed on the numeral 8 and the multiples of 8. The disks bearing other legends will be placed wherever desired.

I claim:—

1. A dial for a clock provided with the usual time indicating characters disposed in a circle and having numerals for indicating the days of a calendar month arranged in a circle concentric with the time indicating characters and having openings in the dial at the calendar indicating numerals, legend bearing members disposed over certain calendar indicating numerals, and means securing the said members to the dial, said members being releasable by means adapted to be thrust through the openings of the dial.

2. A dial for a clock provided with the usual time indicating characters disposed in a circle and having numerals for indicating the days of a calendar month arranged in a circle concentric with the time indicating characters and having recesses coincident with and receiving the calendar indicating numerals and having openings in communication with the recesses, and legend bearing members insertible in selected recesses and held therein and displaceable therefrom by means adapted to be thrust through the said openings of the dial.

MARVIN SMITHEY.

Witnesses:
 VIRGINIA H. SMITHEY,
 GRACE B. MALLORY.